United States Patent [19]

Pistor et al.

[11] Patent Number: 5,073,022
[45] Date of Patent: Dec. 17, 1991

[54] PRESSURE ACTIVATED FILM TENSIONER

[75] Inventors: Helmut H. Pistor, Fairfax; James C. Brown, Alexandria, both of Va.

[73] Assignee: The United States of America as represented by the Secretary of the Army, Washington, D.C.

[21] Appl. No.: 628,829

[22] Filed: Dec. 19, 1990

[51] Int. Cl.⁵ .............................................. G03B 1/48
[52] U.S. Cl. .................................. 352/223; 352/224; 352/227
[58] Field of Search ............... 352/223, 224, 225, 227, 352/228

[56] References Cited

U.S. PATENT DOCUMENTS

| | | | |
|---|---|---|---|
| 1,373,925 | 4/1921 | Wenderhold | 352/225 |
| 4,835,555 | 5/1989 | Maxwell | 352/225 |

Primary Examiner—Monroe H. Hayes
Attorney, Agent, or Firm—Milton W. Lee; Anthony T. Lane

[57] ABSTRACT

The disclosed invention provides a means for controlling film flatness at air interfaces in the aperture where the film is used as an imaging medium between film holder plates, such as aperture plates. The film is held flat by lateral tension applied outward in all directions from the center portion of the area of the film being viewed by rubberized type O-rings in grooves on each of the aperture plates being clamped against the film by various clamping direct transverse pressure means. The lateral tension is caused by the stretch of the O-ring outward from the center of the aperture by the shape of grooves in the plates constraining any inward movement but providing bias movement of the O-rings outward.

2 Claims, 3 Drawing Sheets

PRESSURE ACTIVATED FILM TENSIONER

The invention described herein may be manufactured, used, and licensed by the U.S. Government for governmental purposes without the payment of any royalties thereon.

BACKGROUND OF INVENTION

1. Field

The invention is in the field of controlling film flatness while viewing a still or freeze frame image on the film, and specifically to O-rings placed in specifically configured grooves for exerting lateral tension along the peripheral surfaces of the film at the viewing aperture to stretch and flatten the film.

2. Prior Art

The major disadvantage of film as a support for imaging media and reflectors versus plates is the difficulty of controlling film flatness. Previous means of controlling film flatness have been by the use of one or two pressure plates made of glass to put direct pressure on the film. Some problems with this are the added weight, increased number of optical surfaces and interference effects between these surfaces especially in the infrared spectrum. Film tensioning clamps have been used but these are complex and do not sufficiently apply desired lateral tension. Vacuum plates have been uses which have holes and grooves in the plates to distribute the vacuum suction to the film. These vacuum plates tend to deform the film where vacuum is applied.

SUMMARY OF THE INVENTION

The present invention controls film flatness by apparatus and method of applying lateral tension along the chosen film surfaces selected for viewing in proportion to direct transverse pressure exerted by a film holder plates on each side thereof having interfacing rubberized O-rings, in specific geometrically shaped grooves, which stretch outward from the center of the viewing area while in intimate contact with the film. The film holder plates are preferably aperture plates which have an aperture whose center is at the center of the viewing area on the film. This method of film flatness control permits an air interface at the film surfaces in the aperture. A pressure plate may however be pressed against one side of the film, if the film thickness required limited lateral pressure or other reasons. It is noted that the O-rings must provide static friction with the film.

The inventive apparatus and method will be understood with reference to the following detailed description in view of the drawings.

DETAILED DESCRIPTION OF THE PREFERRED EMBODIMENT

Figure 1:
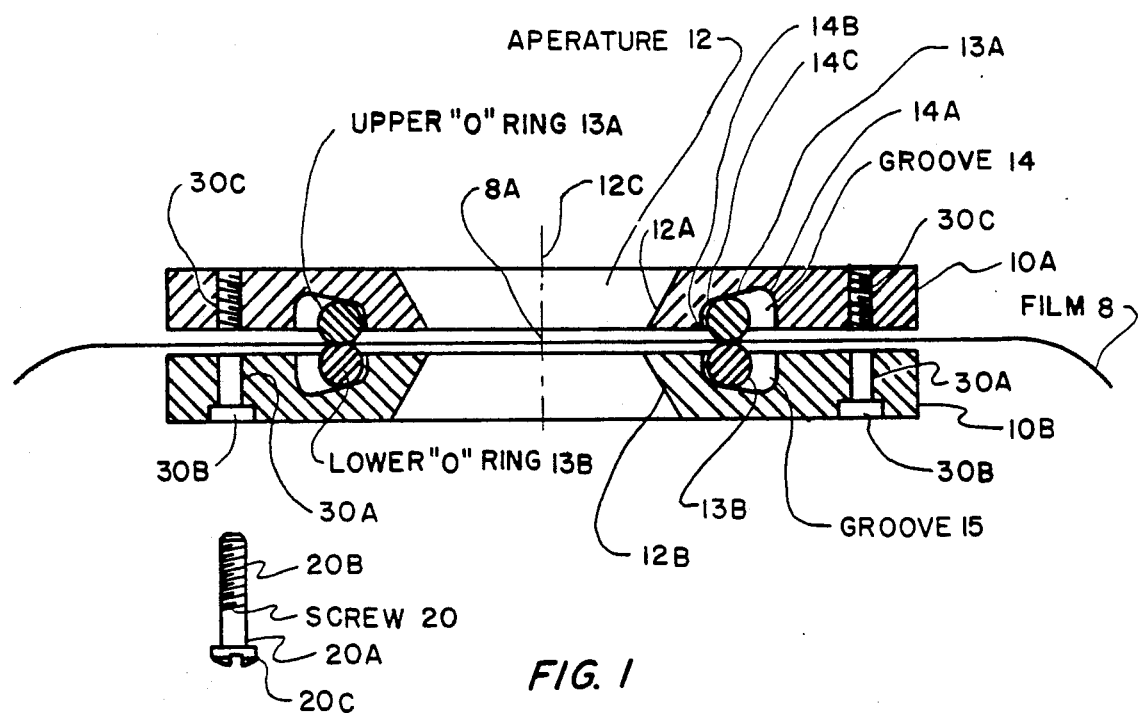
FIG. 1 illustrates a cross-sectional view of one embodiment of two aperture plates with O-rings and grooves in relation to the film with attachment and tensioning means between the plates.

Refer now to FIG. 1 for an explanation of the method of applying lateral tension on selected surfaces of film 8, i.e. providing film flatness, when viewing a portion of the film. It should be noted that the center of the desired viewing area 8A of the film 8 is first positioned at the center 12C of the apertures 12 between upper film holder plate 10A and lower film holder plate 10B. Plates 10A and 10B respectively have matching beveled inner portions 12A and 12B which come to a sharp edge where film 8 is located. Plates 10A and 10B are both shown and explained as aperture plates. However, the invention is not intended to be limited to aperture plates, but may be pressure plates or other type film holders.

Figure 4:
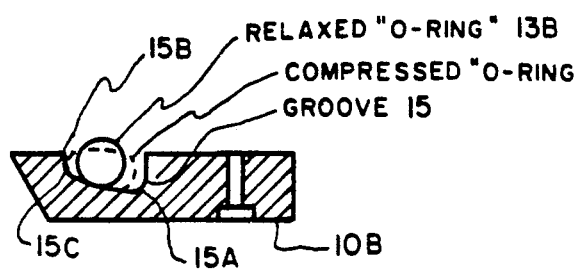
FIG. 4 shows how the O-ring will typically spread or stretch under pressure in one of the grooves of FIG. 1 or 2.

Grooves 14 and 15 are both of the same geometrical cross-sectional shape in the embodiment of FIG. 1. Refer also to FIG. 4, which illustrates only one side view of a cross-section of lower plate 10B, for a better understanding of groove geometry used in the embodiments illustrated by FIGS. 1 and 2. Be it understood that the object of the invention is for the O-ring 13A, designated as the upper O-ring, and O-ring 13B, designated as the lower O-ring, to be constrained from movements inward by the innermost shoulders or wall of the various embodiment grooves and having biasing movement outward toward the outermost groove shoulders or wall, thus causing the O-ring to stretch outward from the center of the aperture when transverse direct pressure is applied through the film by the opposite O-ring contained in the aperture plates 10A and 10B. The stretched O-ring thus applies lateral tension outward from the center 8A of the selected viewing area of the film, which corresponds to the center 12C of aperture 12. FIG. 4 illustrates by solid line the relaxed O-ring 13B when no transverse pressure is applied and by dashed line when the pressure is applied. Each groove 15 is deeper at the outermost rounded shoulder, with the deepest bottom designated as 15A. Likewise the groove 14 in plate 10A is deeper at the outermost rounded shoulder, with the bottom designated as 14A. The rounded fillets 15C ending at should 15B and 14C ending at shoulder 14B not only have a smaller radius of curvature than the outermost rounded shoulders the fillets 15C and 14C are shallower than bottoms 15A and 14A. Therefore, the rubberized O-rings 13B and 13A will spread under transverse pressure from the shallow portions of grooves 15 and 14 along the downward slope of the groove toward the deeper portions respectively at bottoms 15A and 14A, thus causing direct outward stretching from the center of the viewing area 8A of film 8.

The method of applying lateral tension by the outward flow of O-rings 13A and 13B may be by screw threadable means between plates 10A and 10B. One means is illustrated by FIG. 1. A plurality of screws 20, with only one shown, having a smooth neck 20A at the head end 20C and a threaded end 20B may be used to pass through a smooth bore clearance drilled hole 30A in lower plate 10B and thread into a screw threaded hold 30C in the upper plate 10A. However, under some requirements the entire length of 20 may be threaded. The head 20C is preferably counter sunk into counter sink 30B in plate 10B. Plan views of the interfacing side of plate 10B in FIGS. 5 through 7 will better illustrate the functions of plates 10A and 10B in relation to the film 8, the corresponding film center 8A and aperture center 12C, the shape of various cross-sectional grooves 15, 17, and 19, the shapes of various apertures 12 in the plates, and the typical positioning of interfacing holes 30A and 30C (not shown). Film 8 is illustrated as transparent with only the edges shown in FIGS. 5 through 7 to better illustrate 12 and grooves 15, 17, and 19.

Figure 2:
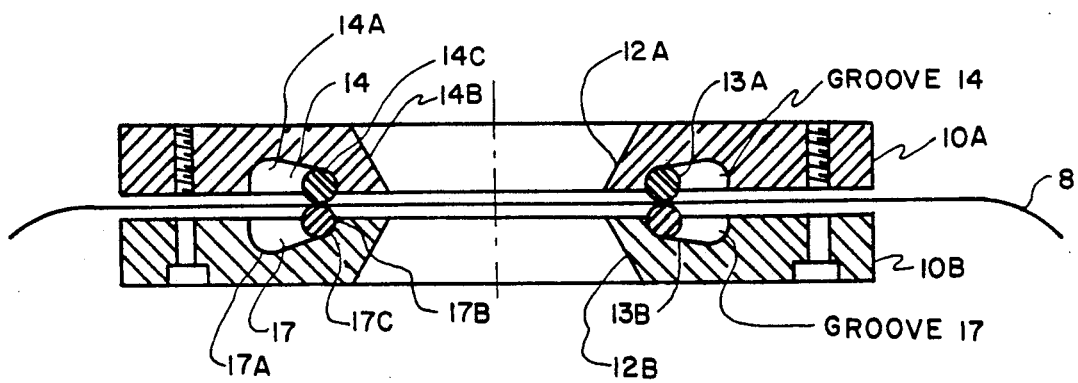
FIG. 2 illustrates a second embodiment illustrating different innermost radius of curvatures of the grooves.

Refer now to FIG. 2 for a second embodiment of the rounded shoulder grooves. In this embodiment one of the grooves has a smaller innermost radius of curvature fillet than the other. It can be either the groove in the upper or in the lower plate. In this illustration, assume that the geometry of the upper groove 14 is the same as was the geometry of grooves 14 and 15 of FIG. 1 but the lower groove 17 has the smaller radius of curvature for fillet 17C and the distance from the shoulder point 17B to the lower part 17C is less than the distance from 14B to the lower part of 14C. However, the depths of grooves 14 and 17 are the same respectively at the bottoms 14A and 17A. The result is that the O-ring in groove 17 applies more lateral tension to film 8 when the transverse direct pressure is applied on the O-rings by plates 10A and 10B.

Figure 3:
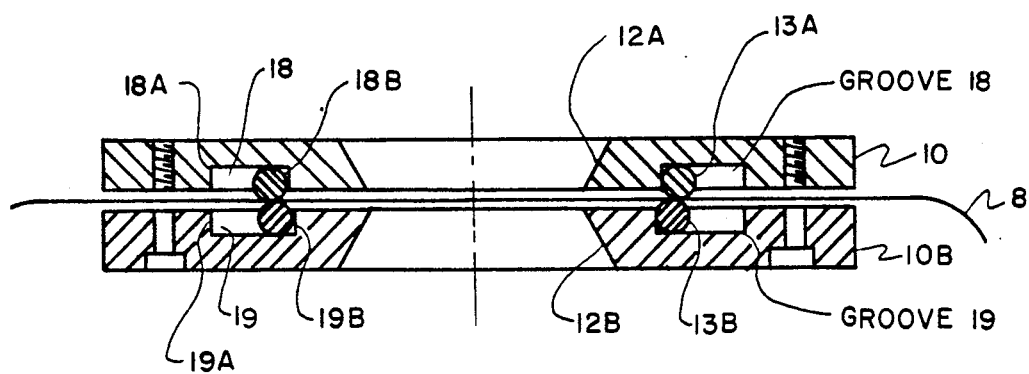
FIG. 3 illustrates a third embodiment wherein the O-ring groove of the bottom plate has a smaller inside diameter than the top plate.

A third embodiment of the geometrical shape of the grooves is illustrated by FIG. 3. In this embodiment the walls of grooves 18 and 19 respectively in plates 10A and 10B are not rounded but are straight and the groove bottoms are flat. The outermost walls 18A and 19A are directly aligned across from each other on plates 10A and 10B. The innermost wall 19B on plate 10B is however extended inward toward the center of the viewing area. Grooves 18 and 19 are the same depth. The result is that the O-ring in groove 18 is biased outward from the center of the viewing area of the film more readily than the O-ring in groove 19, thus applying more lateral tension to film 8 by O-ring 13B.

Figure 5:
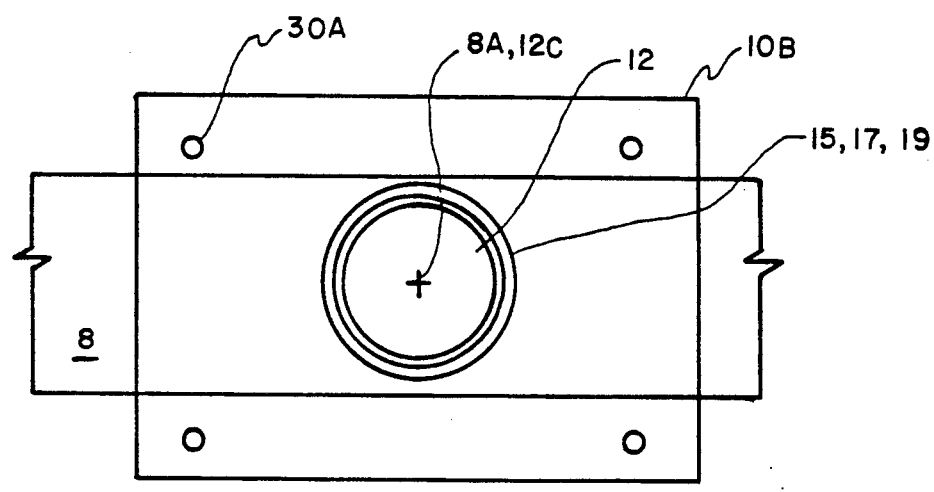
FIGS. 5, 6, and 7 illustrate plan views of three different shape apertures, continuous grooves and apeture plates.
Figure 6:
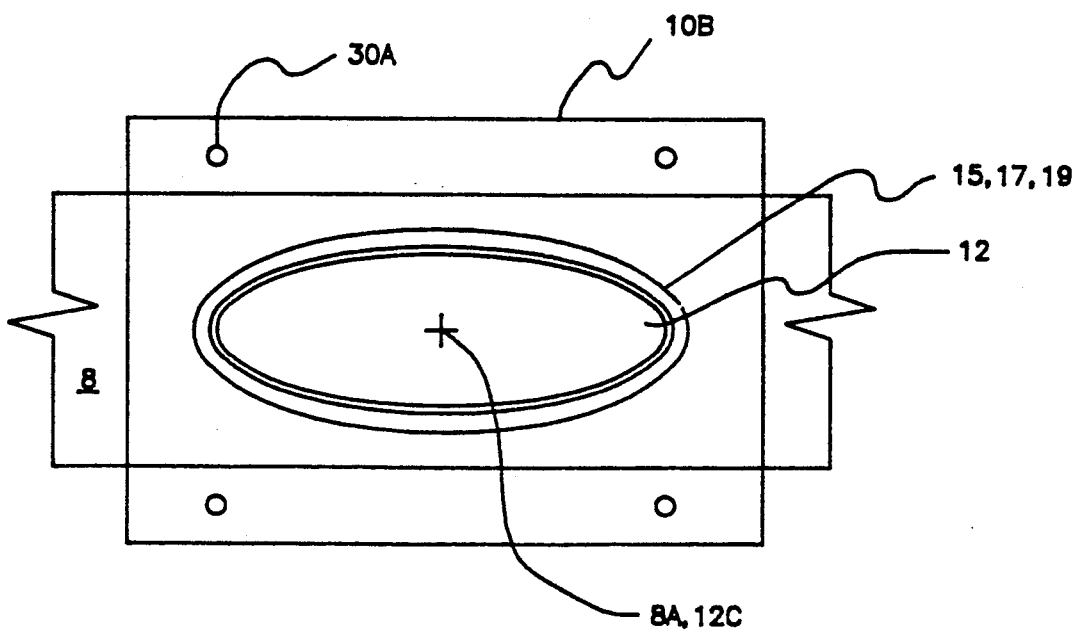
Figure 7:
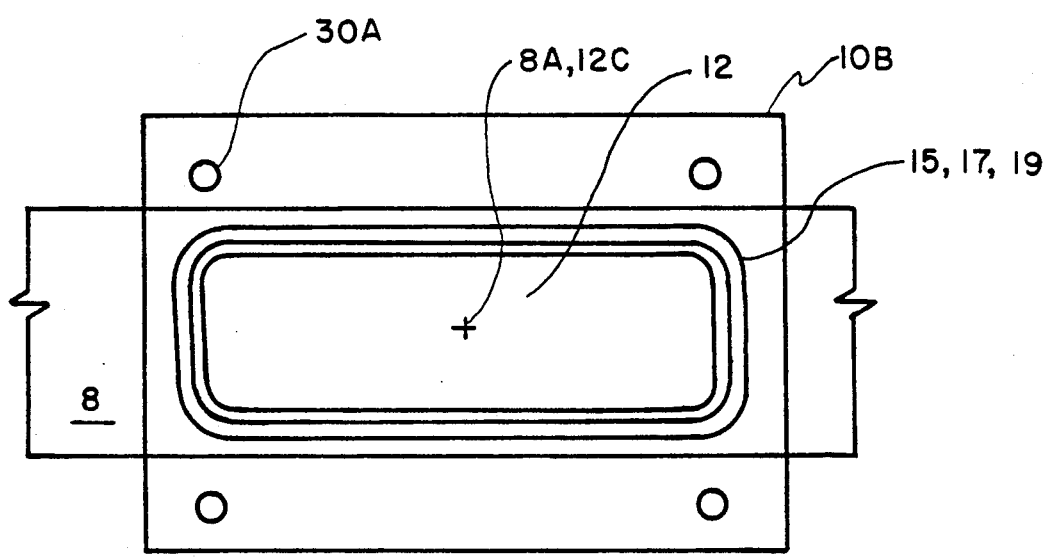

FIGS. 5, 6, and 7 illustrate plan views of three possible shapes or patterns of the grooves in the plates 10A and 10B which may be used with different apertures for optimum exposure for an image on the film 8. FIG. 5 illustrates a rectangular, or possibly a square aperture plate 10B in which either of the specific cross-sectional grooves 15, 17, or 19 may be used to place O-rings therein which are at the outer periphery of film 8 over the center 12C of circular aperture 12. Four holes 30A are shown which are sufficiently spaced for the screw threadable means to apply the proper transverse direct pressure. The plates 10A and 10B are preferably made of metal, such as stainless steel or aluminum, which has the necessary thickness to have the necessary stiffness to not bend at the pressure points of the screw threadable means but apply even transverse pressure between 10A and 10B. FIG. 6 illustrates a rectangular aperture plate 10B having elliptical aperture 12 and groove 15, 17, or 19. FIG. 7 illustrate a rectangular plate 10B have rectangular aperture 12 and groove 15, 17, or 19. The elliptical and rectangular apertures provide optimal exposure and film lateral tension to a rectangular image on film.

Generally, the O-rings in any of the above shapes or patterns are all the same size with the specific cross-section of the grooves determining the stretch of the O-ring under transverse pressure. However, it may be possible that for proper contact between the O-ring and the groove all around the continuous grooves as shown in FIGS. 5, 6, and 7 the diameter and size of the O-ring and the depth of the grooves may be varied to provide more or less lateral film tension at some selected places around the grooves.

We claim:

1. A film tensioner for controlling film flatness comprising:
    two parallel film holder plates having centrally located and matching apertures therein, each plate having at least one specifically configured elongated groove on the respective interfacing surface of each respective plate conforming with the shape of the aperture and adapted to receive an O-ring;
    an O-ring integral with and conforming to the specifically configured groove in each plate, constrained from movement inwardly by the innermost shoulder of the elongated groove;
    means for applying transverse pressure across the two film holder plates whereby film placed between said plates is held taut by static friction from the O-rings and whereupon, as the pressure is applied transversely to said holder plates, the interfacing O-rings are caused to deform, thereby providing a lateral biasing movement outwardly in all directions from the center portion of the area of the film under tension, for effecting a uniform tension across the film to produce a flat film surface.

2. The apparatus of claim 1, wherein the grooves in the respective film holder plates are formed such that the bottom of each respective groove slopes away from the aperture toward the outside edge of the film holder plate, whereupon the application of transverse pressure across the plates causes the O-rings to spread and deform outwardly due to the outward sloping of the bottom portion of the grooves.

* * * * *